US012566465B2

(12) United States Patent
Song et al.

(10) Patent No.: US 12,566,465 B2
(45) Date of Patent: Mar. 3, 2026

(54) COMPLEMENTARY TO ABSOLUTE TEMPERATURE REFERENCE CIRCUIT

(71) Applicant: QUALCOMM Incorporated, San Diego, CA (US)

(72) Inventors: Tongyu Song, San Diego, CA (US); Sang Wook Park, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 214 days.

(21) Appl. No.: 18/392,275

(22) Filed: Dec. 21, 2023

(65) Prior Publication Data

US 2025/0208637 A1 Jun. 26, 2025

(51) Int. Cl.

| | |
|---|---|
| ***G05F 1/46*** | (2006.01) |
| ***G05F 1/56*** | (2006.01) |
| ***G05F 1/575*** | (2006.01) |
| ***G05F 3/26*** | (2006.01) |

(52) U.S. Cl.

CPC .............. *G05F 1/468* (2013.01); *G05F 1/462* (2013.01); *G05F 1/56* (2013.01); *G05F 1/575* (2013.01); *G05F 3/262* (2013.01)

(58) Field of Classification Search

CPC . G05F 1/46; G05F 1/462; G05F 1/575; G05F 3/262; G05F 1/468; G05F 3/245; G05F 1/56; G05F 3/20; G05F 3/24

See application file for complete search history.

(56) References Cited

U.S. PATENT DOCUMENTS

| | | | | |
|---|---|---|---|---|
| 5,315,230 | A | 5/1994 | Cordoba et al. | |
| 8,648,582 | B2 | 2/2014 | Huang et al. | |
| 2008/0136381 | A1* | 6/2008 | Yang | G11C 5/147 365/189.09 |
| 2023/0361777 | A1* | 11/2023 | Mori | H03K 5/134 |

OTHER PUBLICATIONS

International Search Report and Written Opinion—PCT/US2024/055751—ISA/EPO—Feb. 3, 2025.

* cited by examiner

*Primary Examiner* — Alex Torres-Rivera
*Assistant Examiner* — Ularislao Cordova
(74) *Attorney, Agent, or Firm* — Loza & Loza, LLP

(57) ABSTRACT

A system includes a reference circuit. The reference circuit includes a current source configured to generate a reference current, a resistor, and a programmable diode circuit coupled between the current source and the resistor. The programmable diode circuit includes n-type diodes and first switches, wherein each of the first switches is coupled in series with a respective one of the n-type diodes. The programmable diode circuit also includes p-type diodes and second switches, wherein each of the second switches is coupled in series with a respective one of the p-type diodes.

19 Claims, 11 Drawing Sheets

620

| ctat_ctrl<2:0> | No. n-type diodes | No. p-type diodes |
|---|---|---|
| 101 | 24 | 32 |
| 110 | 32 | 32 |
| 111 | 32 | 42 |
| 000 | 48 | 48 |
| 001 | 48 | 64 |
| 010 | 72 | 72 |
| 011 | 72 | 96 |
| 100 | 96 | 96 |

COMPLEMENTARY TO ABSOLUTE TEMPERATURE REFERENCE CIRCUIT

FIELD

Aspects of the present disclosure relate generally to reference circuits, and, more particularly, to complementary to absolute temperature (CTAT) reference circuits.

BACKGROUND

A reference circuit may be used to generate a reference voltage. The reference voltage may be input to a voltage regulator to provide a circuit with a regulated voltage based on the reference voltage.

SUMMARY

The following presents a simplified summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

A first aspect relates to a system. The system includes a reference circuit. The reference circuit includes a current source configured to generate a reference current, a resistor, and a programmable diode circuit coupled between the current source and the resistor. The programmable diode circuit includes n-type diodes and first switches, wherein each of the first switches is coupled in series with a respective one of the n-type diodes. The programmable diode circuit also includes p-type diodes and second switches, wherein each of the second switches is coupled in series with a respective one of the p-type diodes.

A second aspect relates to a method for programming a reference circuit. The reference circuit includes a current source, a resistor, and a programmable diode circuit coupled between the current source and the resistor, wherein the programmable diode circuit includes n-type diodes and p-type diodes. The method includes receiving a digital code, enabling a first number of the n-type diodes based on the digital code, and enabling a second number of the p-type diodes based on the digital code.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
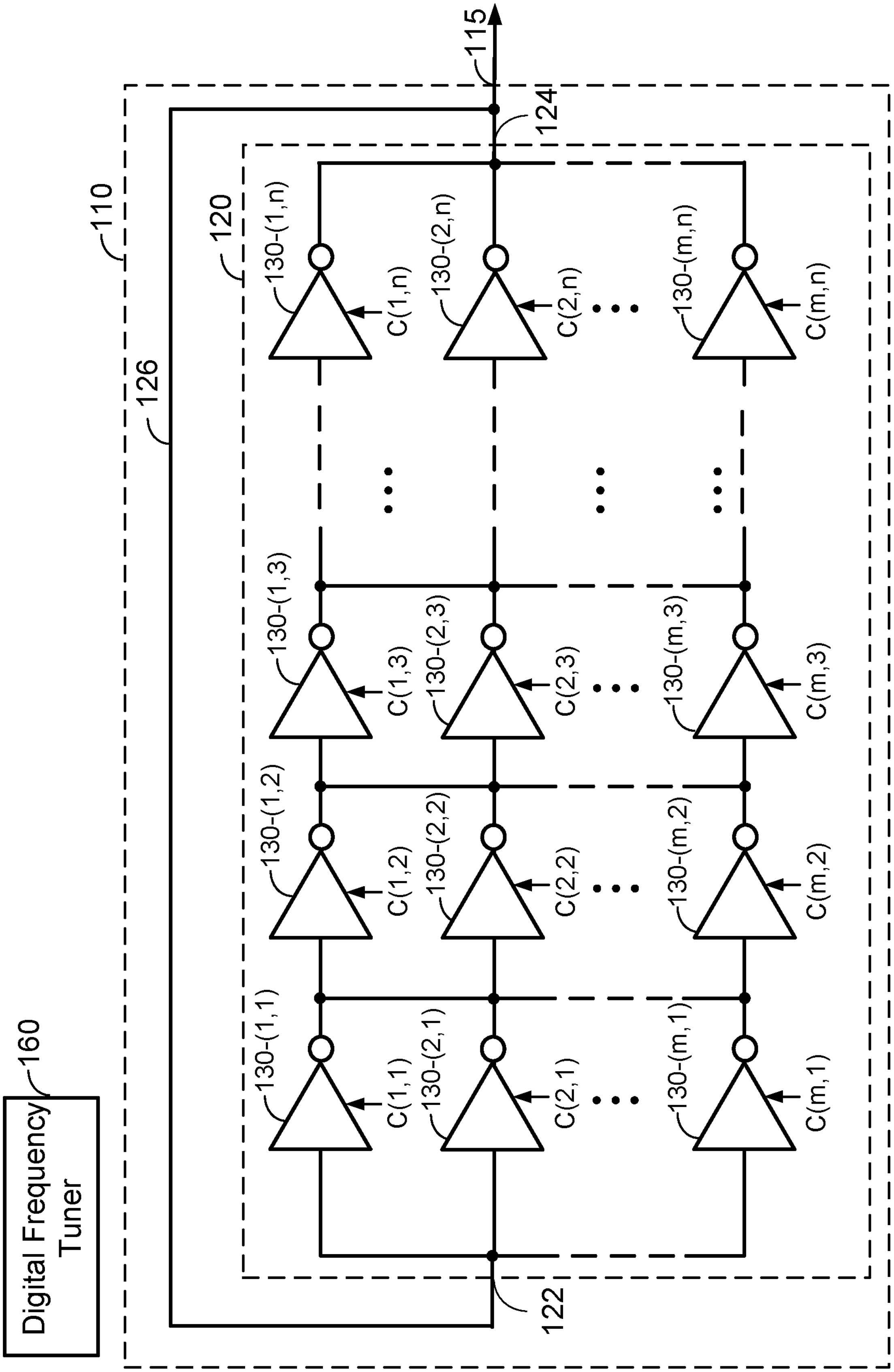
FIG. 1 shows an example of a digitally controlled oscillator (DCO) including tri-state inverters according to certain aspects of the present disclosure.

FIG. 1 shows an example of a digitally controlled oscillator (DCO) 110 according to circuit aspects. The DCO 110 may be used, for example, in a phase locked loop (PLL) to provide a tunable frequency.

The DCO 110 includes an array 120 of tri-state inverters 130-(1,1) to 130-(*m, n*) arranged in m rows and n columns. Each of the tri-state inverters 130-(1,1) to 130-(*m, n*) receives a respective control signal C (1,1) to C (m,n) that controls whether the tri-state inverter is turned on or turned off. For example, each of the tri-state inverters 130-(1,1) to 130-(*m, n*) may be configured to turn on when the respective control signal C (1,1) to C (m,n) is logic one and turn off when the respective control signal C (1,1) to C (m,n) is logic zero, or vice versa. The control signals C (1,1) to C (m,n) may be generated by a digital frequency tuner 160 configured to tune (i.e., adjust) the frequency of the DCO 110 by controlling the number of tri-state inverters 130-(1,1) to 130-(*m, n*) in the array 120 that are turned on using the control signals C (1,1) to C (m,n), as discussed further below. For ease of illustration, the individual connections between the digital frequency tuner 160 and the tri-state inverters 130-(1,1) to 130-(*m, n*) are not shown in FIG. 1.

In this example, the array 120 has an input 122 coupled to the inputs of the tri-state inverters 130-(1,1) to 130-(*m*-1) in the first column of the array 120, and an output 124 coupled to the outputs of the tri-state inverters 130-(1,*n*) to 130-(*m*,*n*) in the last column of the array 120. The DCO 110 also includes a loop 126 coupling the output 124 of the array 120 to the input 122 to array 120 to produce oscillations in the DCO 110. The output 115 of the DCO 110 may be coupled to the output 124 of the array 120.

In this example, the signal at the output 115 of the DCO 110 has a frequency approximately equal to ½d, where d is the delay from the input 122 of the array 120 to the output 124 of the array 120. The delay d depends on the number of tri-state inverters 130-(1,1) to 130-(*m, n*) in the array 120 that are turned on. Thus, the digital frequency tuner 160 can tune (i.e., adjust) the frequency of the DCO 110 by controlling the number of tri-state inverters 130-(1,1) to 130-(*m, n*) in the array 120 that are turned on using the control signals C (1,1) to C (m,n).

Figure 2:
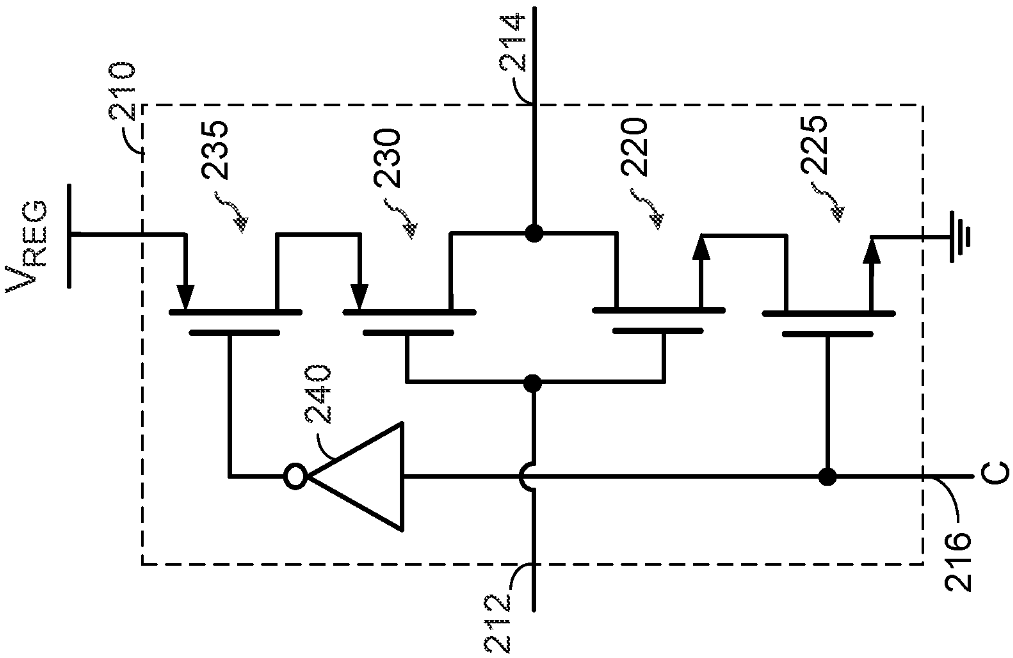
FIG. 2 shows an exemplary implementation of a tri-state inverter according to certain aspects of the present disclosure.

FIG. 2 shows an exemplary implementation of a tri-state inverter 210 according to certain aspects. Each of the tri-state inverters 130-(1,1,) to 130-(*m,n*) may be implemented with a separate instance of the exemplary tri-state inverter 210 shown in FIG. 2. The tri-state inverter 210 has an input 212, an output 214, and a control input 216 configured to receive the respective control signal (e.g., respective one of the control signals C (1,1) to C (m,n)). When the tri-state inverter 210 is turned on by the respective control signal, the tri-state inverter 210 is configured to invert the signal at the input 212 and output the inverted signal at the output 214.

In the example in FIG. 2, the tri-state inverter 210 includes a first p-type field effect transistor (PFET) 230 and a second PFET 235 coupled in series between a regulated voltage VREG and the output 214 of the tri-state inverter 210. The tri-state inverter 210 also includes a first n-type field effect transistor (NFET) 220 and a second NFET 225 coupled in series between the output 214 and ground (or some reference potential). In this example, the gates of the first PFET 230 and the first NFET 220 are coupled to the input 212 of the tri-state inverter 210, the gate of the second NFET 225 is coupled to the control input 216, and the gate of the second PFET 235 is coupled to the control input 216 through an inverter 240.

In this example, the tri-state inverter 210 turns on when the control signal is one. This is because the second NFET 225 and the second PFET 235 are both turned on when the control signal is one. As a result, the first NFET 220 is coupled to the ground through the second NFET 225, and the first PFET 230 is coupled to the regulated voltage VREG through the second PFET 235. The tri-state inverter 210 turns off when the control signal is zero. This is because the second NFET 225 and the second PFET 235 are both turned off when the control signal is zero. As a result, the first NFET 220 is decoupled from ground, and the first PFET 230 is decoupled to the regulated voltage VREG.

It is to be appreciated that the tri-state inverters 130-(1,1,) to 130-(*m,n*) are not limited to the exemplary implementation shown in FIG. 2. In general, each of the tri-state inverters 130-(1,1,) to 130-(*m,n*) may be implemented with an inverter and one or more switches configured to enable or disable the inverter based on the respective control signal.

Figure 3:
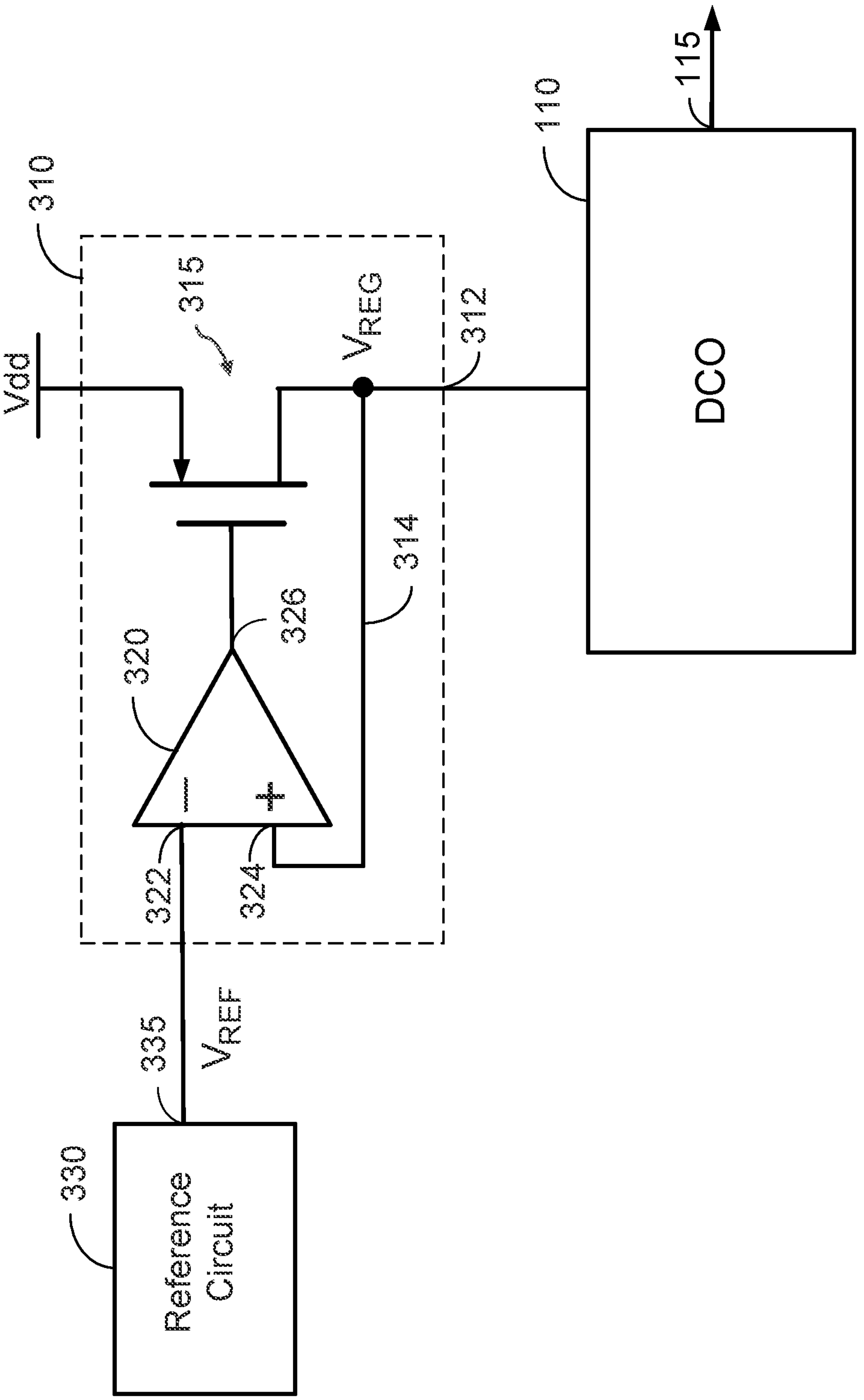
FIG. 3 shows an example of a voltage regulator coupled to the DCO according to certain aspects of the present disclosure.

FIG. 3 shows an example of a voltage regulator 310 coupled to the DCO 110 according to certain aspects. For ease of illustration, the details of the DCO 110 are not shown in FIG. 3. In this example, the voltage regulator 310 is configured to generate the regulated voltage VREG from a supply voltage Vdd, and provide the regulated voltage VREG to a load coupled to the output 312 of the voltage regulator 310. In the example in FIG. 3, the output 312 may be coupled to the tri-state inverters 130-(1,1,) to 130-(*m,n*) (shown in FIG. 1) in the DCO 110 to provide the regulated voltage VREG to the tri-state inverters 130-(1,1,) to 130-(*m,n*).

In the example shown in FIG. 3, the voltage regulator 310 is implemented with a low dropout (LDO) regulator, and includes a pass transistor 315 (e.g., PFET) and an amplifier 320 (sometime referred to as an error amplifier). It is to be appreciated that the voltage regulator 310 may include additional components not shown in FIG. 3 (e.g., one or more capacitors and/or one or more resistors). The voltage regulator 310 receives a reference voltage VREF from a reference circuit 330, which is used to set the regulated voltage VREG, as discussed further below.

In this example, the source of the pass transistor 315 is coupled to a supply rail providing the supply voltage Vdd, and the drain of the pass transistor 315 is coupled to the output 312 of the voltage regulator 310, which is coupled to the DCO 110 in this example. The amplifier 320 has a first input 322, a second input 324, and an output 326. The first input 322 is coupled to the output 335 of the reference circuit 330 to receive the reference voltage VREF. The second input 324 is coupled to the output 312 of the voltage regulator 310 via a feedback path 314. Thus, the regulated voltage VREG at the output 312 is fed back to the second input 324 of the amplifier 320. The output 326 of the amplifier 320 is coupled to the gate of the pass transistor 315. Thus, the output 326 of the amplifier 320 provides the gate voltage of the pass transistor 315.

In operation, the amplifier 320 adjusts the gate voltage of the pass transistor 315 in a direction that reduces the difference between the regulated voltage VREG and the reference voltage VREF. This forces the regulated voltage VREG to be approximately equal to the reference voltage VREF. Thus, the regulated voltage VREG may be set to a desired voltage by setting the reference voltage VREF accordingly.

As discussed above, the DCO 110 may be used in a PLL or another type of circuit to provide a tunable frequency. Advantages of the DCO 110 may include a wide tunable frequency range and a small area. However, a challenge with the DCO 110 is that the frequency of the DCO 110 drifts with temperature. For example, the frequency of the DCO 110 may have a positive temperature coefficient in which the frequency increases with rising temperature. This is because an increase in temperature decreases the delays of the tri-state inverters 130-(1,1,) to 130-(*m,n*) for a given regulated voltage VREG, which increases the frequency of the DCO 110.

Figure 4:
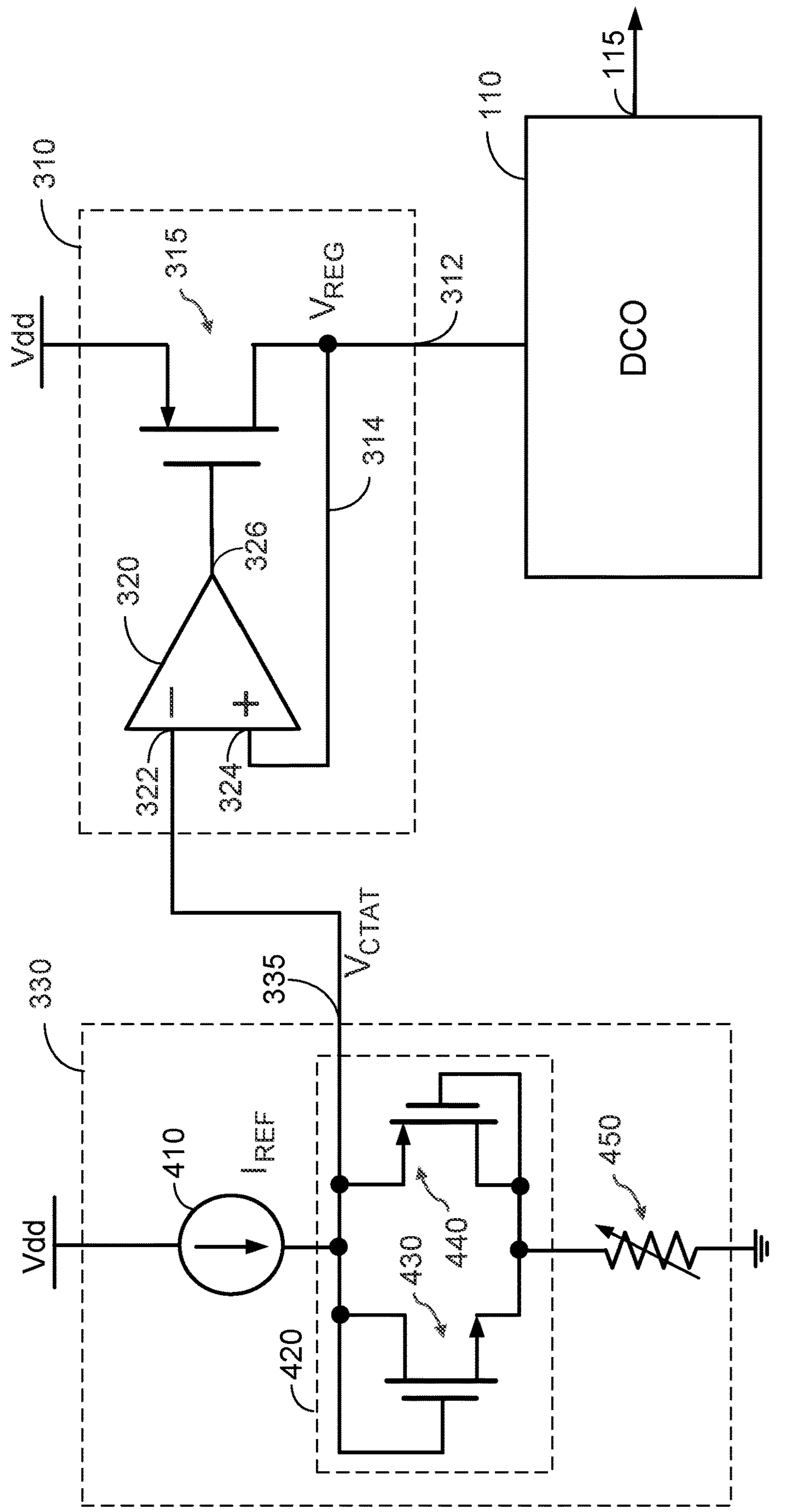
FIG. 4 shows an example of a reference circuit configured to generate a CTAT voltage according to certain aspects of the present disclosure.

The frequency drift may be reduced by generating a reference voltage with a negative temperature coefficient that compensates for the positive temperature coefficient of the frequency of the DCO 110. In this regard, FIG. 4 shows an exemplary implementation of the reference circuit 330 in which the reference circuit 330 is configured to generate a reference voltage with a negative temperature coefficient (i.e., a complementary to absolute temperate (CTAT) voltage $V_{CTAT}$) to reduce the frequency drift of the DCO 110, which has a positive temperature coefficient. In this example, the reference circuit 330 includes a current source 410, a diode circuit 420, and a variable resistor 450. As used herein, a "diode circuit" is a circuit including multiple diodes. The multiple diodes may be coupled in parallel.

The current source 410 is configured to generate a reference current $I_{REF}$ which flows through the diode circuit 420 and the resistor 450 to generate the CTAT voltage $V_{CTAT}$. In certain aspects, the current source 410 may be implemented with a temperature compensated-current source or a bandgap reference current source so that the reference current $I_{REF}$ is approximately constant across a temperature range. In the example in shown FIG. 4, the current source 410 is coupled between a supply rail and the output 335 of the reference circuit 330. However, it is to be appreciated that the present disclosure is not limited to this example.

In this example, the diode circuit 420 and the resistor 450 are coupled in series between the output 335 of the reference circuit 330 and ground (or some reference potential). In the shown example in FIG. 4, the diode circuit 420 is coupled between the output 335 of the reference circuit 330 and the resistor 450, and the resistor 450 is coupled between the diode circuit 420 and ground. However, it is to be appreciated that the present disclosure is not limited to this example.

In this example, the diode circuit 420 includes a p-type diode 440 and an n-type diode 430 coupled in parallel. The p-type diode 440 is implemented with a diode-connected p-type field transistor (PFET) in which the drain and gate of the PFET are coupled together. The n-type diode 430 is implemented with a diode-connected n-type field effect transistor (NFET) in which the drain and the gate of the NFET are coupled together. Although one p-type diode 440 and one n-type diode 430 are shown in FIG. 4 for ease of illustration, it is to be appreciated that the diode circuit 420 may include multiple p-type diodes and multiple n-type diodes coupled in parallel.

The p-type diode 440 has a negative temperature coefficient in which the voltage drop across the p-type diode 440 decreases with increasing temperature for a given reference current $I_{REF}$. The n-type diode 430 also has a negative temperature coefficient in which the voltage drop across the n-type diode 430 decreases with increasing temperature for a given current $I_{REF}$. Since the p-type diode 440 and the n-type diode 430 are coupled in parallel, the diode circuit 420 has a negative temperature coefficient in which voltage drop across the diode circuit 420 decreases with increasing temperature for a given current $I_{REF}$.

In this example, the CTAT voltage $V_{CTAT}$ at the output 335 of the reference circuit 330 is equal to the sum of the voltage drop across the diode circuit 420 and the voltage drop across the resistor 450. Since the voltage drop across the diode circuit 420 decreases with increasing temperature, the CTAT voltage $V_{CTAT}$ also decreases with increasing temperature. The CTAT voltage $V_{CTAT}$ reduces the frequency drift of the DCO 110 with temperature. This is because the CTAT voltage $V_{CTAT}$ decreases the frequency of the DCO 110 with increasing temperature which counteracts the increase in the frequency of the DCO 110 with increasing temperature.

In certain aspects, the resistance of the resistor 450 may be insensitive to temperature over a temperature range so that the resistor 450 has little to no effect on the negative temperature coefficient of the CTAT voltage $V_{CTAT}$. In this example, the resistance of the resistor 450 may be programmed to set the CTAT voltage $V_{CTAT}$ at a desired voltage at a certain temperature. The diode circuit 420 may then change the voltage of the CTAT voltage $V_{CTAT}$ with temperature to compensate for the positive temperature coefficient of the frequency of the DCO 110 to reduce frequency drift.

The negative temperature coefficient of the diode circuit 420 may be sensitive to process variation, the sizes of the diodes 430 and 440, and/or one or other parameters. This makes it challenging to design the negative temperature coefficient of the diode circuit 420 to match the positive temperature coefficient of the frequency of the DCO 110. Another challenge is that the negative temperature coefficient of the diode circuit 420 may need to be redesigned for different DCOs and/or a redesign of the DCO 110, which increases cost and development time.

To address the above, aspects of the present disclosure provide a programmable diode circuit. In certain aspects, the programmable diode includes n-type diodes and p-type diodes, and switches for programming the number of n-type diodes and/or the number of p-type diodes that are enabled. This allows the negative temperature coefficient of the programmable diode circuit to be programmed (i.e., tuned) by programming the number of n-type diodes and/or the number of p-type diodes that are enabled. For example, the negative temperature coefficient of the diode circuit may be programmed to more closely match the positive temperature coefficient of the DCO frequency for different process corners, different DCO designs, etc.

Figure 5:
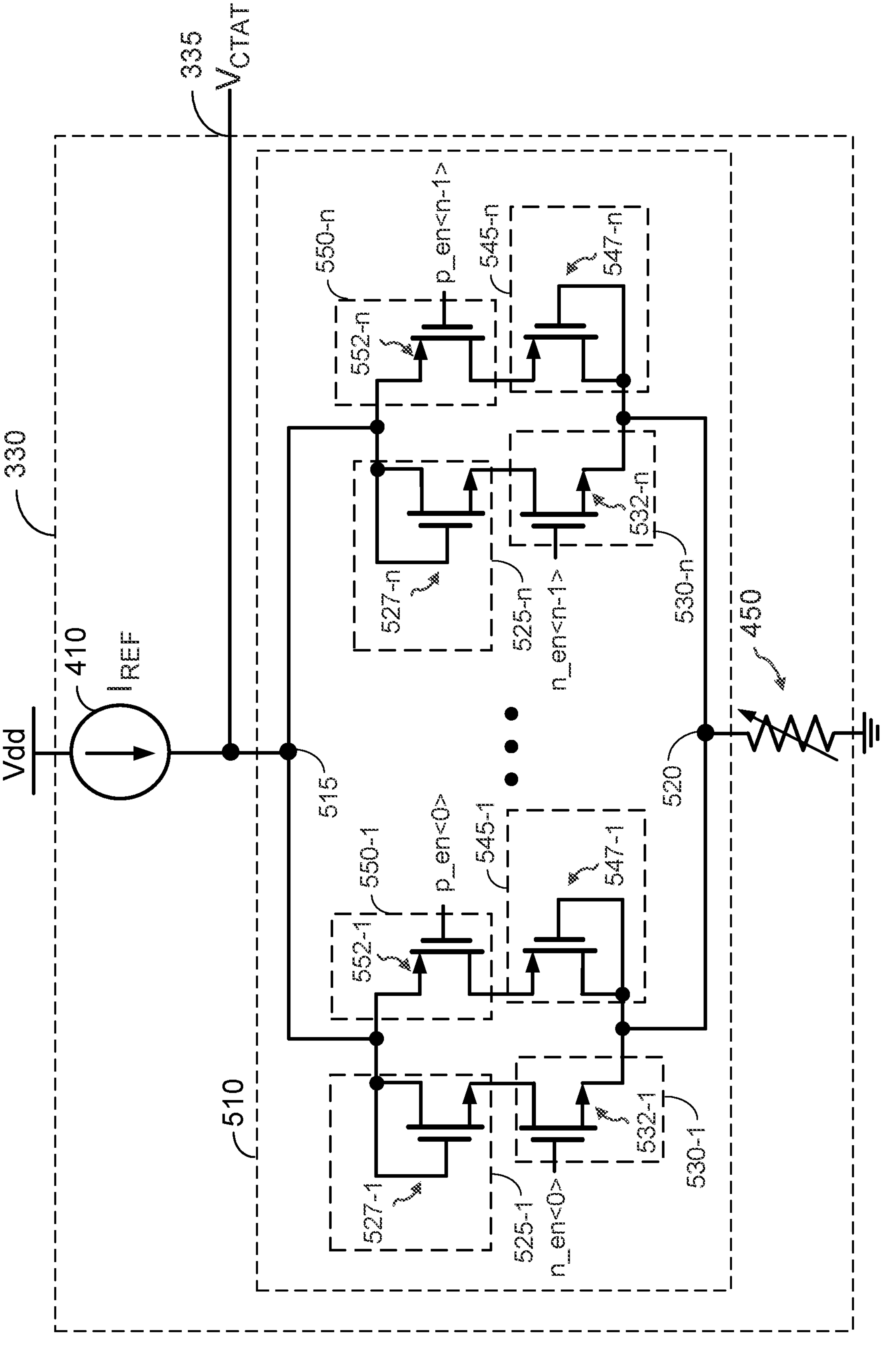
FIG. 5 shows an example of a reference circuit including a programmable diode circuit according to certain aspects of the present disclosure.

FIG. 5 shows an example of a programmable diode circuit 510 according to certain aspects of the present disclosure. In the example in FIG. 5, the programmable diode circuit 510 is included in the reference circuit 330. The programmable diode circuit 510 and the resistor 450 are coupled in series between the output 335 of the reference circuit 330 and ground (or some reference potential) to generate the CTAT voltage $V_{CTAT}$.

In this example, the programmable diode circuit 510 includes n-type diodes 525-1 to **525-*n* and p-type diodes 545-1 to 545-*n*. In the example shown in FIG. 5, each of the n-type diodes 525-1 to 525-*n* includes a respective NFET 527-1 to 527-*n* where the drain and the gate of the respective NFET 527-1 to 527-*n* are coupled together. It is to be appreciated that each of the n-type diodes 525-1 to 525-*n* is not limited to one NFET. For example, in some implementations, each of the n-type diodes 525-1 to 525-*n*** may include multiple diode-connected NFETs coupled in parallel and/or series.

The programmable diode circuit 510 also includes first switches 530-1 to **530-*n* configured to control a number of the n-type diodes 525-1 to 525-*n* that are enabled. In the example shown in FIG. 5, each of the first switches 530-1 to 530-*n* is coupled in series with a respective one of the n-type diodes 525-1 to 525-*n*. In this example, each of the first switches 530-1 to 530-*n* is turned on (i.e., closed) to enable the respective one of the n-type diodes 525-1 to 525-*n* and turned off (i.e., opened) to disable the respective one of the n-type diodes 525-1 to 525-*n*. Thus, the number of the n-type diodes 525-1 to 525-*n* that are enabled can be controlled by controlling the number of the first switches 530-1 to 530-*n* that are turned on. In the example shown in FIG. 5, each of the first switches 530-1 to 530-*n* and the respective one of the n-type diodes 525-1 to 525-*n* are coupled in series between a first node 515 and a second node 520, where the first node 515 is coupled to the output 335 of the reference circuit 330, and the second node 520 is coupled to the resistor 450**.

In the example shown in FIG. 5, each of the first switches 530-1 to **530-*n* is configured to receive a respective one of the control signals n_en<0> to n_en<n−1> which controls the on/off state of the switch. For example, each of the first switches 530-1 to 530-*n* may be configured to turn on when the respective one of the control signals n_en<0> to n_en<n−1> has a first logic value (e.g., one), and turn off when the respective one of the control signals n_en<0> to n_en<n−1> has a second logic value (e.g., zero). In the example shown in FIG. 5, each of the first switches 530-1 to 530-*n* includes a respective NFET 532-1 and 532-*n* in which the gate of the respective NFET 532-1 to 532-*n* receives the respective one of the control signals n_en<0> to n_en<n−1>. However, it is to be appreciated that the first switches 530-1 to 530-*n*** are not limited to this example implementation.

In the example shown in FIG. 5 each of the p-type diodes 545-1 to **545-*n* includes a respective PFET 547-1 to 547-*n* where the drain and the gate of the respective PFET 547-1** to 547-*n* are coupled together. It is to be appreciated that each of the p-type diodes 545-1 to 545-*n* is not limited to one PFET. For example, in some implementations, each of the p-type diodes 545-1 to 545-*n* may include multiple diode-connected PFETs coupled in parallel and/or series.

The programmable diode circuit 510 also includes second switches 550-1 to 550-*n* configured to control a number of the p-type diodes 545-1 to 545-*n* that are enabled. In the example shown in FIG. 5, each of the second switches 550-1 to 550-*n* is coupled in series with a respective one of the p-type diodes 545-1 to 545-*n*. Each of the second switches 550-1 to 550-*n* is turned on to enable the respective one of the p-type diodes 545-1 to 545-*n* and turned off to disable the respective one of the p-type diodes 545-1 to 545-*n*. Thus, the number of the p-type diodes 545-1 to 545-*n* that are enabled can be controlled by controlling the number of the second switches 550-1 to 550-*n* that are turned on. In the example shown in FIG. 5, each of the second switches 550-1 to 550-*n* and the respective one of the p-type diodes 545-1 to 545-*n* are coupled in series between the first node 515 and the second node 520.

In the example shown in FIG. 5, each of the second switches 550-1 to 550-*n* is configured to receive a respective one of the control signals p_en<0> to p_en<n−1> which controls the on/off state of the switch. For example, each of the second switches 550-1 to 550-*n* may be configured to turn on when the respective one of the control signals p_en<0> to p_en<n−1> has the second logic value (e.g., zero), and turn off when the respective one of the control signals p_en<0> to p_en<n−1> has the first logic value (e.g., one). In the example shown in FIG. 5, each of the second switches 550-1 to 550-*n* includes a respective PFET 552-1 and 552-*n* in which the gate of the respective PFET 552-1 to 552-*n* receives the respective one of the control signals p_en<0> to p_en<n−1>. However, it is to be appreciated that the second switches 550-1 to 550-*n* are not limited to this example implementation.

Thus, the number of the n-type diodes 525-1 to 525-*n* that are enabled and the number of the p-type diodes 545-1 to 545-*n* that are enabled can be programmed using the control signals n_en<0> to n_en<n−1> and p_en<0> to p_en<n−1>, respectively. It is to be appreciated that, in some implementations, the number of the n-type diodes 525-1 to 525-*n* that are enabled and the number of the p-type diodes 545-1 to 545-*n* that are enabled may be different (e.g., to adjust the ratio of p-type diodes that are enabled to n-type diodes that are enabled). The number of the n-type diodes 525-1 to 525-*n* that are enabled may also be referred to as a first number, and the number of the p-type diodes 545-1 to 545-*n* that are enabled may be referred to as a second number. The first number and the second number may be equal or may be different.

In this example, the negative temperature coefficient of the programmable diode circuit 510 can be programmed (i.e., tuned) by programming the number of the n-type diodes 525-1 to 525-*n* that are enabled and the number of the p-type diodes 545-1 to 545-*n* that are enabled using the control signals n_en<0> to n_en<n−1> and p_en<0> to p_en<n-1>, respectively. For example, the negative temperature coefficient of the programmable diode circuit 510 may be programmed to more closely match the positive temperature coefficient of the frequency of the DCO 110 (shown in FIG. 3) for different process corners, different DCO designs, etc.

Figures 6A, 6B:
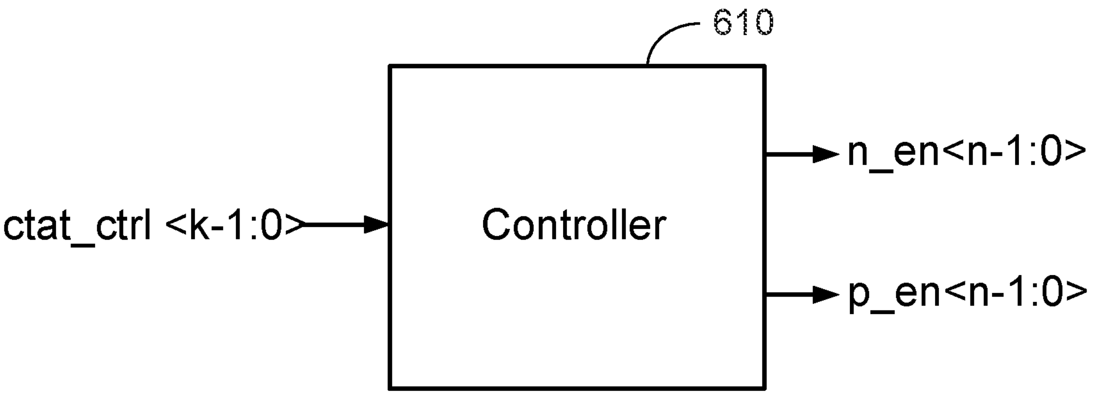
FIG. 6A shows an example of a controller configured to program the programmable diode circuit according to certain aspects of the present disclosure.
FIG. 6B shows an example of a table for programming the programmable diode circuit according to certain aspects of the present disclosure.

FIG. 6A shows an example of a controller 610 configured to program the programmable diode circuit 510 according to certain aspects. The controller 610 is configured to receive a digital control code ctat_ctrl <k-1:0>, and program the number of the n-type diodes 525-1 to 525-*n* that are enabled and the number of the p-type diodes 545-1 to 545-*n* that are enabled based on the control code ctat_ctrl <k-1:0> using the control signals n_en<0> to n_en<n−1> and p_en<0> to p_en<n−1>, respectively. The controller 610 may be implemented with gated logic, a field programmable gate array (FPGA), programmable logic devices (PLDs), discrete hardware circuits, and/or other suitable hardware.

FIG. 6B shows an example of a table 620 including an example of different possible values for the control code ctat_ctrl <k-1:0> where the number of bits in the control code is three (i.e., k=3) in this example. The table 620 also includes an example of the number of the n-type diodes 525-1 to 525-*n* that are enabled and the number of the p-type diodes 545-1 to 545-*n* that are enabled for each possible value of the control code ctat_ctrl <k-1:0>. It is to be appreciated that the controller 610 is not limited to the example shown in the exemplary table 620. In general, the controller 610 may map each possible value of the control code ctat_ctrl <k-1:0> to a respective number of n-type diodes 525-1 to 525-*n* that are enabled and a respective number of the p-type diodes 545-1 to 545-*n* that are enabled.

Figure 7:
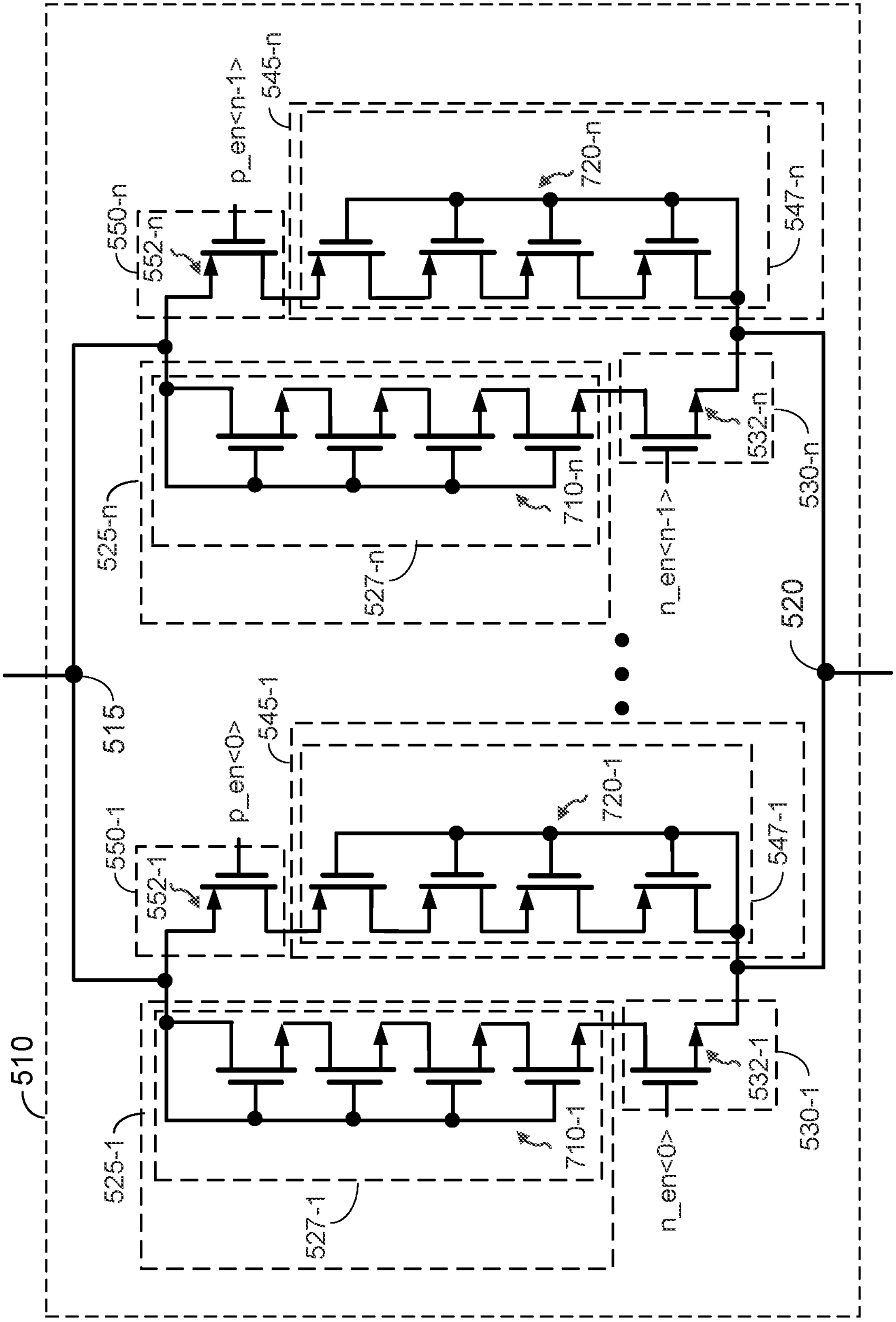
FIG. 7 shows an exemplary implementation of p-type diodes and n-type diodes in the programmable diode circuit according to certain aspects of the present disclosure.

FIG. 7 shows an example in which the NFET 527-1 to 527-*n* of each of the n-type diodes 525-1 to 525-*n* is physically implemented on a chip with a respective stack of NFETs 710-1 to 710-*n*, in which the channels of the NFETs in the stack are coupled in series and the gates of the NFETs in the stack are coupled to the drain of the top NFET in the stack. FIG. 7 also shows an example in which the PFET 547-1 to 547-*n* of each of the p-type diodes 545-1 to 545-*n* is physically implemented on a chip with a respective stack of PFETs 720-1 to 720-*n*, in which the channels of the PFETs in the stack are coupled in series and the gates of the PFETs in the stack are coupled to the drain of the bottom PFET in the stack.

Figure 8:
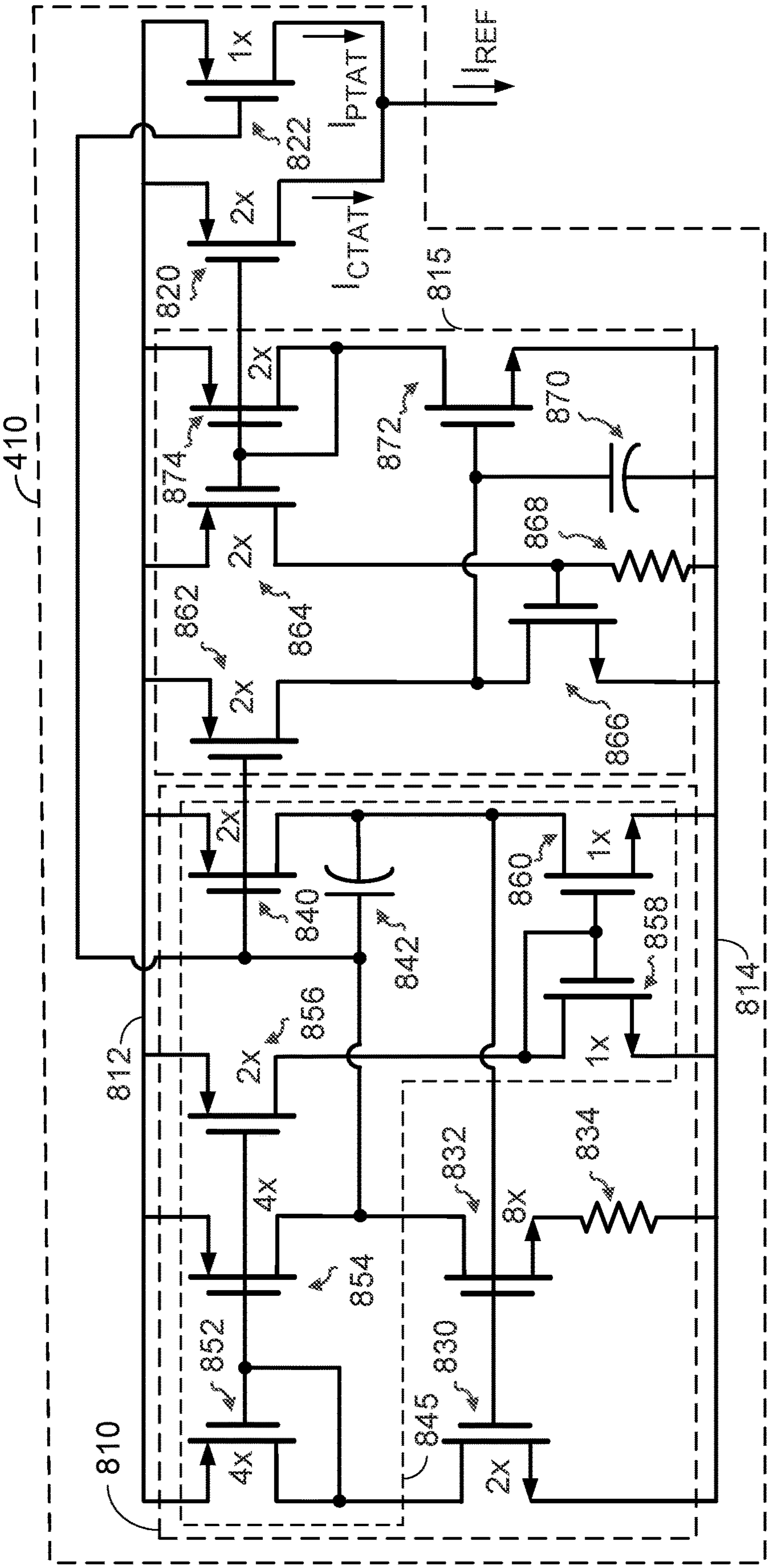
FIG. 8 shows an exemplary implementation of a reference current source according to certain aspects of the present disclosure.

FIG. 8 shows an exemplary implementation of the current source 410 according to certain aspects. In this example, the current source 410 includes a proportional to absolute temperature (PTAT) circuit 810, a CTAT circuit 815, a first transistor 820, and a second transistor 822.

In this example, each of the first transistor 820 and the second transistor 822 is coupled between a supply rail 812 and the output 335 of the reference circuit 330. The gate of the first transistor 820 is coupled to the CTAT circuit 815, and the gate of the second transistor 822 is coupled to the PTAT circuit 810. Each of the first transistor 820 and the second transistor 822 may be implemented with a respective PFET, as shown in the example in FIG. 8.

The PTAT circuit 810 is configured to generate a PTAT current and mirror the PTAT current to the second transistor 822. Thus, the current $I_{PTAT}$ flowing through the second transistor 822 is proportional to the PTAT current generated by the PTAT circuit 810. As used herein, "proportional" covers the possibility of a proportionality factor of one. The CTAT circuit 815 is configured to generate a CTAT current and mirror the CTAT current to the first transistor 820. Thus, the current $I_{CTAT}$ flowing through the first transistor 820 is proportional to the CTAT current generated by the CTAT circuit 815. The current $I_{CTAT}$ flowing through the first transistor 820 and the current $I_{PTAT}$ flowing through the second transistor 822 are combined into the reference current $I_{REF}$, which flows through the diode circuit 510 and the resistor 450. The reference current $I_{REF}$ is approximately constant over a temperature range when the negative temperature coefficient of the current $I_{CTAT}$ and the positive temperature coefficient of the current $I_{PTAT}$ are matched over the temperature range.

In the example in FIG. 8, the PTAT circuit 810 includes a third transistor 830, a fourth transistor 832, a current mirror 845, and a resistor 834. The gate of the third transistor 830 is coupled to the gate of the fourth transistor 832, the source of the third transistor 830 is coupled to a low rail 814 (e.g., ground rail), and the resistor 834 is coupled between the source of the fourth transistor 832 and the low rail 814. The low rail 814 has a lower potential than the supply rail 812. In this example, each of the third transistor 830 and the fourth transistor 832 is implemented with a respective NFET, in which the channel width of the fourth transistor 832 is larger than the channel width of the third transistor 830. For example, the ratio of the channel width of the fourth transistor 832 to the channel width of the third transistor 830 may be 4:1 or another ratio. In FIG. 8, examples of the relative sizes of the channel widths of the transistors are indicated next to the transistors. The drain of the third transistor 830 is coupled to the current mirror 845 and the drain of the fourth transistor 832 is coupled to the current mirror 845.

The current mirror 845 is configured to mirror the current flowing through the resistor 834 to the second transistor 822. As discussed further below, the current flowing through the resistor 834 provides the PTAT current. The current mirror 845 may also be configured to provide approximately equal currents for the third transistor 830 and fourth transistor 832.

In operation, the third transistor 830 and the fourth transistor 832 are operated in the subthreshold region. The voltage drop across the resistor 834 is equal to the difference of the gate-to-source voltage of the third transistor 830 and the gate-to-source voltage of the fourth transistor 832. The voltage difference has a positive temperature coefficient, causing the current flowing through the resistor 834 to also have a positive temperature coefficient. The current flowing through the resistor 834 provides the PTAT current discussed above. The current mirror 845 mirrors the PTAT current flowing through the resistor 834 to the second transistor 822 to provide the current $I_{PTAT}$.

In the example in FIG. 8, the current mirror 845 includes a fifth transistor 852, a sixth transistor 854, a seventh transistor 856, an eighth transistor 858, a ninth transistor 860, and a tenth transistor 840, as arranged in FIG. 8. The gate of the fifth transistor 852 is coupled to the gate of the sixth transistor 854 and the gate of the seventh transistor 856, and the sources of the fifth transistor 852, the sixth transistor 854, and the seventh transistor 856 are coupled to the supply rail 812. The drain of the fifth transistor 852 is coupled to the drain of the third transistor 830 and the gate of the fifth transistor 852, and the drain of the sixth transistor 854 is coupled to the drain of the fourth transistor 832.

The drain of the eighth transistor 858 is coupled to the drain of the seventh transistor 856 and the gate of the eighth transistor 858, the gate of the eighth transistor 858 is coupled to the gate of the ninth transistor 860, the source of the eighth transistor 858 is coupled to the low rail 814, and the source of the ninth transistor 860 is coupled to the low rail 814.

The gate of the tenth transistor 840 is coupled to the gate of the second transistor 822 to mirror the PTAT current generated by the PTAT circuit 810 to the second transistor 822. The source of the tenth transistor 840 is coupled to the supply rail 812, the drain of the tenth transistor 840 is coupled to the drain of the ninth transistor 860, and a capacitor 842 is coupled between the gate and the drain of the tenth transistor 840.

In operation, the sixth transistor 854 mirrors the PTAT current flowing through the resistor 834 to the seventh transistor 856. The current flowing through the seventh transistor 856 flows through the eighth transistor 858, which mirrors the current to the ninth transistor 860. The current flowing through the ninth transistor 860 then flows through the tenth transistor 840, which mirrors the current to the second transistor 822.

The CTAT circuit 815 includes an eleventh transistor 862, a twelfth transistor 866, a thirteenth transistor 864, a fourteenth transistor 872, a fifteenth transistor 874, a resistor 868, and a capacitor 870.

The gate of the eleventh transistor 862 is coupled to the gate of the tenth transistor 840, and the source of the eleventh transistor 862 is coupled to the supply rail 812. The drain of the twelfth transistor 866 is coupled to the drain of the eleventh transistor 862, the source of the twelfth transistor 866 is coupled to the low rail 814, and the resistor 868 is coupled to between the gate of the twelfth transistor 866 and the low rail 814. The gate of the fourteenth transistor 872 is coupled to the drain of the twelfth transistor 866, and the source of the fourteenth transistor 872 is coupled to the low rail 814. The capacitor 870 is coupled between the gate of the fourteenth transistor 872 and the low rail 814. The sources of the thirteenth transistor 864 and the fifteenth transistor 874 are coupled to the supply rail 812, and the gate of the fifteenth transistor 874 is coupled to the gate of the thirteenth transistor 864, the gate of the first transistor 820, and the drain of the fifteenth transistor 874. The drain of the thirteenth transistor 864 is coupled to the gate of the twelfth transistor 866, and the drain of the fifteenth transistor 874 is coupled to the drain of the fourteenth transistor 872.

In operation, the PTAT current from the PTAT circuit 810 is mirrored to the eleventh transistor 862. The current flowing through the eleventh transistor 862 flows through the twelfth transistor 866, which is operated in the subthreshold region. The gate-to-source voltage of the twelfth transistor 866 (which has a negative temperature coefficient) appears across the resistor 868. This causes the current flowing through the resistor 868 to have a negative temperature coefficient, which provides the CTAT current discussed above. The thirteenth transistor 864 mirrors the CTAT current flowing through the resistor 868 to the first transistor 820.

Figure 9:
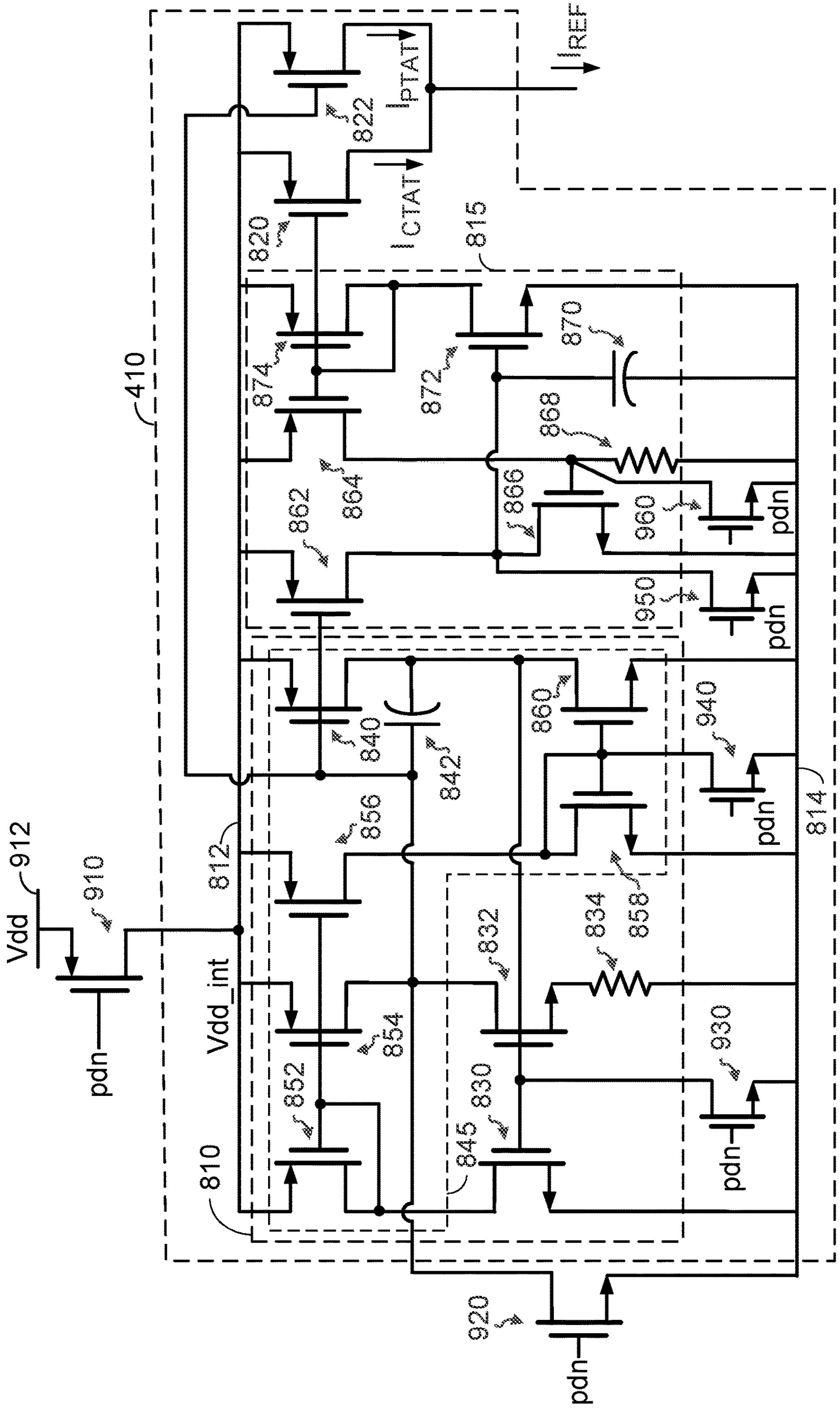
FIG. 9 shows an example of a head switch and pull-down switches coupled to the reference current source according to certain aspects of the present disclosure.

In certain aspects, switches may be coupled to the reference current source 410 to power down the reference current source 410 when the reference current source 410 is not needed to conserve power. In this regard, FIG. 9 shows an example in which the switches include a power switch 910 (e.g., head switch), a first pull-down switch 920, a second pull-down switch 930, a third pull-down switch 940, a fourth pull-down switch 950, and a fifth pull-down switch 960. In the example in FIG. 9, the power switch 910 is implemented with a PFET, and each of the pull-down switches 920, 930, 940, 950, and 960 is implemented with a respective NFET. However, it is to be appreciated that the present disclosure is not limited to this example.

The power switch 910 is coupled between a second supply rail 912 and the supply rail 812 of the reference current source 410. In the discussion below, the supply rail 812 is referred to as the first supply rail. The second supply rail 912 provides a supply voltage Vdd. When the power switch 910 is turned on, the first supply rail 812 is coupled to the second supply rail 912. As a result, the supply voltage Vdd is provided to the first supply rail 812 (also referred to as an internal supply rail). When the power switch 910 is turned off, the first supply rail 812 is decoupled from the second supply rail 912.

Each of the pull-down switches 920, 930, 940, 950, and 960 is coupled between a respective internal node of the reference current source 410 and the low rail 814 (e.g., ground potential). In the example shown in FIG. 9, the first pull-down switch 920 is coupled between the gate of the tenth transistor 840 and the low rail 814. The second pull-down switch 930 is coupled between the gates of the third transistor 830 and the fourth transistor 832 and the low rail 814. The third pull-down switch 940 is coupled between the gates of the eighth transistor 858 and the ninth transistor 860 and the low rail 814. The fourth pull-down switch 950 is coupled between the gate of the fourteenth transistor 872 and the low rail 814. The fifth pull-down switch 960 is coupled between the gate of the twelfth transistor 866 and the low rail 814.

In this example, the on/off states of the power switch 910 and the pull-down switches 920, 930, 940, 950, and 960 are controlled by the power control signal pdn. For example, the power switch 910 may turn off and the pull-down switches 920, 930, 940, 950, and 960 may turn on when the power control signal pdn has a first logic value (e.g., one). The power switch 910 may turn on and the pull-down switches 920, 930, 940, 950, and 960 may turn off when the power control signal pdn has a second logic value (e.g., zero).

In this example, the power control signal pdn may be set to the first logic value to power down the reference current source 410. In this case, the first supply rail 812 is decoupled from the second supply rail 912, and each of the pull-down switches 920, 930, 940, 950, and 960 pulls down the respective internal node of the reference current source 410 to the low rail 814 (e.g., ground potential).

The power control signal pdn may be set to the second logic value to power up the reference current source 410. In this case, the first supply rail 812 is coupled to the second supply rail 912 through the power switch 910, and each of the pull-down switches 920, 930, 940, 950, and 960 is turned off.

It is desirable to shorten the start up time of the reference circuit 330. In this regard, FIG. 10 shows an example in which the power control pdn to the first pull-down switch 920 is delayed to decrease the start up time, as discussed further below.

In this example, a delay circuit 1010 is coupled between the power switch 910 and the first pull-down switch 920. The delay circuit 1010 delays the power control signal pdn and outputs the delayed power control signal pdn_dly to the first pull-down switch 920. In the example in FIG. 10, the power switch 910 is implemented with a PFET and the first pull-down switch 920 is implemented with an NFET, in which the delay circuit 1010 is coupled between the gate of the PFET and the gate of the NFET. In the example in FIG. 10, the delay circuit 1010 includes a first inverter 1012 and a second inverter 1014 coupled in series between the power switch 910 and the first pull-down switch 920. The delay circuit 1010 also includes a load capacitor 1016 coupled between the output of the first inverter 1012 and ground.

During power up, the power control signal pdn transitions from the first logic value (e.g., one) to the second logic value (e.g., zero). When the power control signal pdn transitions to the second logic value, the power switch 910 turns on, coupling the first supply rail 812 to the second supply rail 912. When the power switch 910 initially turns on, the first pull-down switch 920 remains turned on for a short period of time equal to the delay of the delay circuit 1010 since the first pull-down switch 920 receives the delayed power control signal pnd_dly. As a result, the gate of the tenth transistor 840 in the current mirror 845 is pulled down to the low rail 814 by the first pull-down switch 920 for the short period of time. Since the tenth transistor 840 is implemented with a PFET in this example, the tenth transistor 840 is turned on. This causes a strong current to flow through the tenth transistor 840, which decreases the start-up time.

Figure 10:
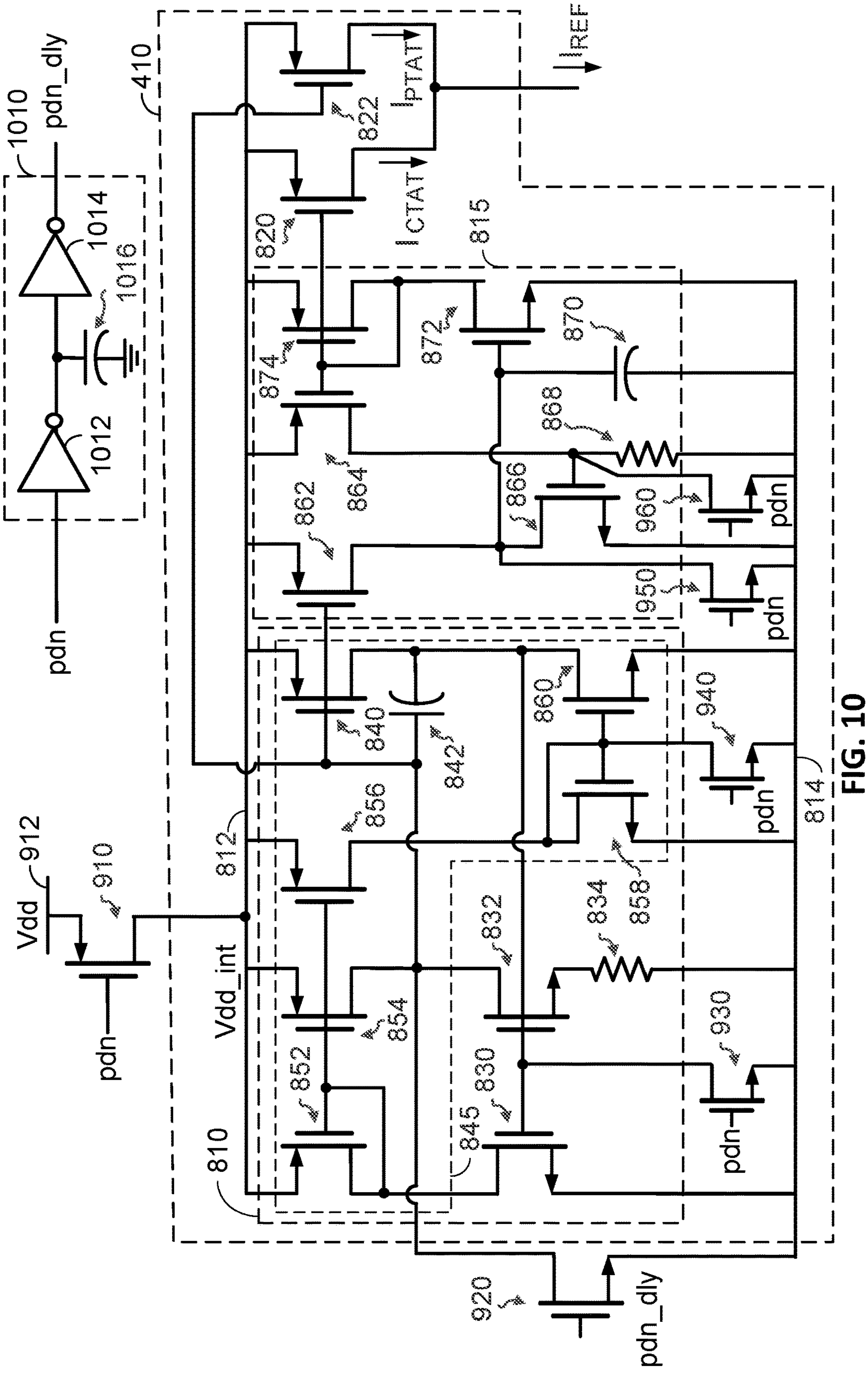
FIG. 10 shows an example of a circuit for reducing the start-up time of the reference circuit according to certain aspects of the present disclosure.

Although the first pull-down switch 920 is coupled between the gate of the tenth transistor 840 in the example shown in FIG. 10, it is to be appreciated that the present disclosure is not limited to this example. In general, the first pull-down may be coupled between any internal node of the reference current source 410 and the low rail 814, in which pulling down the internal node for the short period of time after the power switch 910 is turned on decreases the start-up time of the reference current source 410.

Figure 11:
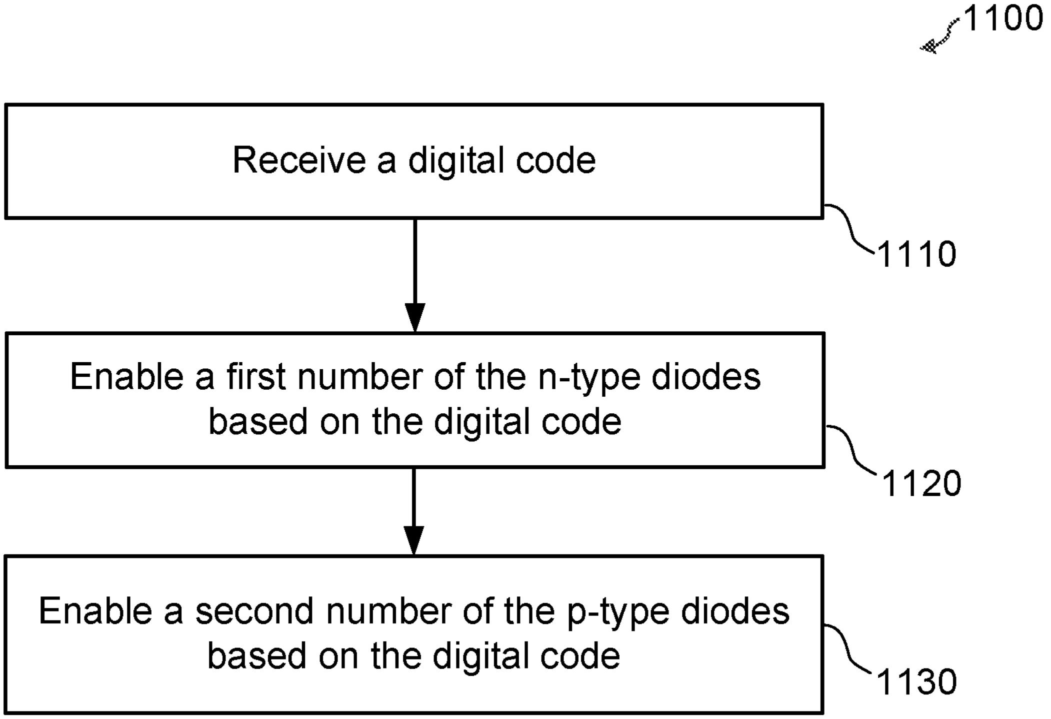
FIG. 11 is a flowchart illustrating an exemplary method for programming a reference circuit according to certain aspects of the present disclosure.

FIG. 11 shows an exemplary method 1100 for programming a reference circuit. The reference circuit (e.g., reference circuit 330) includes a current source (e.g., current source 410), a resistor (e.g., resistor 450), and a programmable diode circuit (e.g., diode circuit 510) coupled between the current source and the resistor, wherein the programmable diode circuit includes n-type diodes (e.g., n-type diodes 525-1 to 525-*n*) and p-type diodes (e.g., p-type diodes 545-1 to 545-*n*).

At block 1110, a digital code is received. For example, the digital code may correspond to the digital code ctat_ctrl<k:0>.

At block 1120, a first number of the n-type diodes are enabled based on the digital code.

For example, the controller 610 may enable the first number of the n-type diodes. The first number may be less than or equal to the total number of n-type diodes in the programmable diode circuit.

At block 1130, a second number of the p-type diodes are enabled based on the digital code. For example, the controller 610 may enable the second number of the p-type diodes. The second number may be less than or equal to the total number of p-type diodes in the programmable diode circuit. The first number and the second number may be different.

Implementation examples are described in the following numbered clauses:

1. A system, comprising:
   - a reference circuit, wherein the reference circuit comprises:
     - a current source configured to generate a reference current;
     - a resistor; and
     - a programmable diode circuit coupled between the current source and the resistor, wherein the programmable diode circuit includes:
       - n-type diodes;
       - first switches, wherein each of the first switches is coupled in series with a respective one of the n-type diodes;
       - p-type diodes; and
       - second switches, wherein each of the second switches is coupled in series with a respective one of the p-type diodes.
2. The system of clause 1, wherein:
   - each of the first switches and the respective one of the n-type diodes are coupled in series between a first node and a second node, wherein the first node is coupled to the current source, and the second node is coupled to the resistor; and each of the second switches and the respective one of the p-type diodes are coupled in series between the first node and the second node.

3. The system of clause 2, wherein:

the current source is coupled between a supply rail and the first node; and the resistor is coupled between the second node and a ground.

4. The system of any one of clauses 1 to 3, wherein:

at least one of the n-type diodes comprises a respective n-type field effect transistor (NFET) having a respective gate and a respective drain coupled together; and at least one of the p-type diodes comprises a respective p-type field effect transistor (PFET) having a respective gate and a respective drain coupled together.

5. The system of any one of clauses 1 to 4, wherein:

the current source is coupled between a supply rail and an output of the reference circuit; and the programmable diode circuit and the resistor are coupled in series between the output of the reference circuit and a ground.

6. The system of clause 5, further comprising:

a digitally controlled oscillator (DCO); and a voltage regulator coupled to the output of the reference circuit and the DCO, whereon the voltage regulator is configured to generate a regulated voltage based on a voltage at the output of the reference circuit, and provide the regulated voltage to the DCO.

7. The system of clause 6, wherein the DCO comprises an array of tri-state inverters.

8. The system of any one of clauses 1 to 7, further comprising a controller coupled to the first switches and the second switches, wherein the controller is configured to:

receive a digital code; and control on/off states of the first switches and on/off states of the second switches based on the digital code.

9. The system of clause 8, wherein the controller is configured to:

turn on a first number of the first switches based on the digital code; and turn on a second number of the second switches based on the digital code.

10. The system of clause 9, wherein the first number and the second number are different.

11. The system of any one of clauses 1 to 10, wherein the current source is coupled between a first supply rail and an output of the reference circuit, and the system further comprises:

a power switch coupled between the first supply rail and a second supply rail;

a pull-down switch coupled between an internal node of the current source and a low rail; and a delay circuit coupled between the power switch and the pull-down switch.

12. The system of clause 11, wherein:

the power switch comprises a p-type field effect transistor (PFET);

the pull-down switch comprises an n-type field effect transistor (NFET); and the delay circuit is coupled between a gate of the PFET and a gate of the NFET.

13. The system of clause 11 or 12, wherein the delay circuit comprises a first inverter and a second inverter coupled in series.

14. The system of any one of clauses 1 to 13, wherein current source comprises:

a first transistor;

a complementary to absolute temperature (CTAT) circuit coupled to a gate of the first transistor, wherein the CTAT circuit is configured to generate a CTAT current, and mirror the CTAT current to the first transistor;

a second transistor; and a proportional to absolute temperature (PTAT) circuit coupled to a gate of the second transistor, wherein the PTAT circuit is configured to generate a PTAT current, and mirror the PTAT current to the second transistor;

wherein a first current flowing through the first transistor and a second current flowing through the second current are combined to provide the reference current.

15. The system of clause 14, wherein:

the first transistor is coupled between a supply rail and an output of the reference circuit;

the second transistor is coupled between the supply rail and the output of the reference circuit; and the programable diode circuit and the resistor are coupled in series between the output of the reference circuit and a ground.

16. The system of clause 14 or 15, wherein the PTAT circuit comprises:

a third transistor, wherein a source of the third transistor is coupled to a low rail;

a fourth transistor, wherein a gate of the fourth transistor is coupled to a gate of the third transistor;

a resistor coupled between a source of the fourth transistor and the low rail; and a current mirror configured to mirror a current flowing through the resistor to the second transistor, wherein the current flowing the resistor provides the PTAT current.

17. The system of clause 16, wherein the current source is coupled between a first supply rail, and the system further comprises:

a power switch coupled between the first supply rail and a second supply rail;

a pull-down switch coupled between an internal node of the current mirror and a low rail; and a delay circuit coupled between the power switch and the pull-down switch.

18. A method for programming a reference circuit, the reference circuit including a current source, a resistor, and a programmable diode circuit coupled between the current source and the resistor, wherein the programmable diode circuit includes n-type diodes and p-type diodes, the method comprising:

receiving a digital code;

enabling a first number of the n-type diodes based on the digital code; and enabling a second number of the p-type diodes based on the digital code.

19. The method of clause 18, wherein the first number and the second number are different.

20. The method of clause 18 or 19, wherein:

enabling the first number of the n-type diodes based on the digital code comprises turning on first switches, wherein each of the first switches is coupled in series with a respective one of the first number of the n-type diodes; and enabling the second number of the p-type diodes based on the digital code comprises turning on second switches, wherein each of the second switches is coupled in series with a respective one of the second number of the p-type diodes.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect electrical coupling between two structures. It is also to be appreciated that the term "ground" may refer to a direct current (DC) ground or an alternating current (AC) ground, and thus the term "ground" covers both possibilities. An AC ground may be provided by a DC voltage. As used herein, the term "approximately" means within 90 percent to 110 percent of the stated value. It is to be appreciated that a transistor may be implemented on a chip with two or more transistors coupled in parallel and/or series.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. A system, comprising:

a reference circuit, wherein the reference circuit comprises:

a current source configured to generate a reference current;

a resistor; and a programmable diode circuit coupled between the current source and the resistor, wherein the programmable diode circuit includes:

diode-connected n-type field effect transistors (NFETs);

first switches, wherein each of the first switches is coupled in series with a respective one of the diode-connected NFETs;

diode-connected p-type field effect transistors (PFETs); and second switches, wherein each of the second switches is coupled in series with a respective one of the diode-connected PFETs.

2. The system of claim 1, wherein:

each of the first switches and the respective one of the diode-connected NFETs are coupled in series between a first node and a second node, wherein the first node is coupled to the current source, and the second node is coupled to the resistor; and each of the second switches and the respective one of the diode-connected PFETs are coupled in series between the first node and the second node.

3. The system of claim 2, wherein:

the current source is coupled between a supply rail and the first node; and the resistor is coupled between the second node and a ground.

4. The system of claim 1, wherein:

the current source is coupled between a supply rail and an output of the reference circuit; and the programmable diode circuit and the resistor are coupled in series between the output of the reference circuit and a ground.

5. The system of claim 4, further comprising:

a digitally controlled oscillator (DCO); and a voltage regulator coupled to the output of the reference circuit and the DCO, whereon the voltage regulator is configured to generate a regulated voltage based on a voltage at the output of the reference circuit, and provide the regulated voltage to the DCO.

6. The system of claim 5, wherein the DCO comprises an array of tri-state inverters.

7. The system of claim 1, further comprising a controller coupled to the first switches and the second switches, wherein the controller is configured to:

receive a digital code; and control on/off states of the first switches and on/off states of the second switches based on the digital code.

8. The system of claim 7, wherein the controller is configured to:

turn on a first number of the first switches based on the digital code; and turn on a second number of the second switches based on the digital code.

9. The system of claim 8, wherein the first number and the second number are different.

10. The system of claim 1, wherein the current source is coupled between a first supply rail and an output of the reference circuit, and the system further comprises:

a power switch coupled between the first supply rail and a second supply rail;

a pull-down switch coupled between an internal node of the current source and a low rail; and a delay circuit coupled between the power switch and the pull-down switch.

11. The system of claim 10, wherein:

the power switch comprises a p-type field effect transistor (PFET);

the pull-down switch comprises an n-type field effect transistor (NFET); and the delay circuit is coupled between a gate of the PFET and a gate of the NFET.

12. The system of claim 10, wherein the delay circuit comprises a first inverter and a second inverter coupled in series.

13. The system of claim 1, wherein current source comprises:

a first transistor;

a complementary to absolute temperature (CTAT) circuit coupled to a gate of the first transistor, wherein the CTAT circuit is configured to generate a CTAT current, and mirror the CTAT current to the first transistor;

a second transistor; and a proportional to absolute temperature (PTAT) circuit coupled to a gate of the second transistor, wherein the PTAT circuit is configured to generate a PTAT current, and mirror the PTAT current to the second transistor;

wherein a first current flowing through the first transistor and a second current flowing through the second current are combined to provide the reference current.

14. The system of claim 13, wherein:

the first transistor is coupled between a supply rail and an output of the reference circuit;

the second transistor is coupled between the supply rail and the output of the reference circuit; and the programable diode circuit and the resistor are coupled in series between the output of the reference circuit and a ground.

15. The system of claim 13, wherein the PTAT circuit comprises:

a third transistor, wherein a source of the third transistor is coupled to a low rail;

a fourth transistor, wherein a gate of the fourth transistor is coupled to a gate of the third transistor;

a resistor coupled between a source of the fourth transistor and the low rail; and a current mirror configured to mirror a current flowing through the resistor to the second transistor, wherein the current flowing the resistor provides the PTAT current.

16. The system of claim 15, wherein the current source is coupled between a first supply rail, and the system further comprises:

a power switch coupled between the first supply rail and a second supply rail;

a pull-down switch coupled between an internal node of the current mirror and a low rail; and a delay circuit coupled between the power switch and the pull-down switch.

17. A method for programming a reference circuit, the reference circuit including a current source, a resistor, and a programmable diode circuit coupled between the current source and the resistor, wherein the programmable diode circuit includes diode-connected n-type field effect transistors (NFETs) and diode-connected p-type field effect transistors (PFETs), the method comprising:

receiving a digital code;

enabling a first number of the diode-connected NFETs based on the digital code; and enabling a second number of the diode-connected PFETs based on the digital code.

18. The method of claim 17, wherein the first number and the second number are different.

19. The method of claim 17, wherein:

enabling the first number of the diode-connected NFETs based on the digital code comprises turning on first switches, wherein each of the first switches is coupled in series with a respective one of the first number of the diode-connected NFETs; and enabling the first-second number of the diode-connected PFETs based on the digital code comprises turning on second switches, wherein each of the second switches is coupled in series with a respective one of the first second number of the diode-connected PFETs.

* * * * *